United States Patent [19]

Theobald

[11] Patent Number: 5,055,534
[45] Date of Patent: Oct. 8, 1991

[54] PREPARATION OF VERY LOW MOLECULAR WEIGHT POLYETHYLENE IN A FLUIDIZED BED

[75] Inventor: Eugene H. Theobald, Poca, W. Va.

[73] Assignee: Union Carbide Chemicals and Plastics Technology Corporation, Danbury, Conn.

[21] Appl. No.: 458,357

[22] Filed: Dec. 28, 1989

[51] Int. Cl.$^5$ ............................ C08F 2/34; C08F 2/36
[52] U.S. Cl. ................................. 526/133; 526/129; 526/141; 526/142; 526/144; 526/236; 526/901; 526/905
[58] Field of Search ............... 526/133, 142, 153, 905, 526/129, 141, 144, 901, 236

[56] References Cited

U.S. PATENT DOCUMENTS

| | | | |
|---|---|---|---|
| 4,302,565 | 11/1981 | Goeke et al. | 526/88 |
| 4,302,566 | 11/1981 | Karol et al. | 526/125 |
| 4,525,547 | 6/1985 | Kato et al. | 526/901 X |
| 4,710,538 | 12/1987 | Jorgensen et al. | 526/901 X |
| 4,851,488 | 7/1989 | Burstain | 526/78 |

FOREIGN PATENT DOCUMENTS 0120501 10/1984 .
0120503 10/1984 European Pat. Off. .

Primary Examiner—Fred Teskin
Attorney, Agent, or Firm—John S. Piscitello

[57] ABSTRACT

Ethylene homopolymers or copolymers having a very low molecular weight are continuously prepared in a fluidized bed in the presence of high concentrations of hydrogen, while maintaining high catalyst activity, by means of a vanadium-based catalyst.

20 Claims, No Drawings 5,055,534

PREPARATION OF VERY LOW MOLECULAR WEIGHT POLYETHYLENE IN A FLUIDIZED BED

FIELD OF THE INVENTION

This invention relates to a process for preparing very low molecular weight ethylene polymers in a fluidized bed. More particularly, this invention relates to a fluidized bed process for preparing ethylene homopolymers and copolymers having a melt index of from about 500 g/10 minutes to about 2500 g/10 minutes.

BACKGROUND OF THE INVENTION

The low molecular weight polyethylene market is spanned by products having molecular weights varying from just a few hundred to several thousand. Polymers having weight average molecular weights of from about 2,000 to about 4,000 are generally classified as waxes, while polymers having weight average molecular weights of from about 4,000 to about 14,000 are generally classified as wax-resins. The waxes have melt indices varying from about 1000 g/10 minutes to about 2500 g/10 minutes, while the wax-resins have melt indices varying from about 500 g/10 minutes to about 1000 g/10 minutes.

Polyethylene waxes and wax-resins are conventionally prepared by the high pressure (>100,000 kPa) homopolymerization of ethylene in stirred and elongated tubular reactors in the absence of solvent using free radical initiators. However, the elevated pressure required to produce these low molecular weight materials by this technique necessitates a high level of energy consumption which materially affects the manufacturing cost of these products.

Gas-phase, fluidized bed processes, such as described in U.S. Pat. Nos. 4,302,565 and 4,302,566, are well known cost effective methods of producing high modulus, high molecular weight ethylene copolymers having a density of from 0.91 g/cm$^3$ to 0.96 g/cm$^3$. However, such processes have not heretofore been employed to produce very low molecular weight products such as waxes and wax-resins. The reason for this is that low molecular weight materials of this type have low sintering temperatures which causes the polymer particles to soften and stick together at the reactor temperatures normally employed in fluidized bed polymerizations. As a result of this particle agglomeration, fluidization soon ceases and polymerization comes to a halt due to reactor fouling.

European patent 0 120 053 discloses that low modulus ethylene copolymers having a density of less than 0.91 g/cm$^3$ can be prepared in gas phase in a fluidized bed using a titanium-based catalyst provided that a large volume of a diluent gas is present in the reaction mixture. According to this reference, hydrogen may be employed as a diluent gas in a mol ratio of hydrogen to ethylene of from 0.01:1 to 0.5:1. In this process, the hydrogen acts not only as a diluent, but also as a chain transfer agent to regulate the molecular weight of the copolymers produced by the process. Copolymers having a melt index of from greater than 0 g/10 minutes to about 25 g/10 minutes are produced by the process.

European patent 0 120 501 discloses that ethylene copolymers having a density of less than 1.91 g/cm$^3$ can also be prepared in gas phase in a fluidized bed using a vanadium-based catalyst by following the procedure of European patent 0 120 053, i.e., by employing a large volume of a diluent gas in the reaction mixture. According to this reference, hydrogen may be employed in a mol ratio of hydrogen to ethylene of from 0.001:1 up to 2.0:1. However, this reference only discloses the preparation of copolymers having a melt index up to 300 dg/min., preferably from 0.1 dg/min. to 50 dg/min, and, like European patent 0 120 053, does not contemplate the production of very low molecular weight copolymers.

Attempts have been made to produce very low molecular weight waxes and wax-resins in a fluidized bed by modifying the procedure of European patent 0 120 053, e.g., by increasing the concentration of hydrogen in the reactor. Hydrogen, of course, is a well known chain transfer agent and is frequently employed in ethylene polymerizations to control molecular weight. However, it has been found that catalyst activity is adversely affected at the high concentrations of hydrogen required to produce the desired products (at least 60 mol percent hydrogen in the reaction mixture), and if the concentration of hydrogen exceeds 50 mol percent, catalyst activity virtually ceases and polymerization in effect comes to a halt.

Copending application Ser. No. 458,343 of M. C. Hwu et al., filed Dec. 28, 1989, discloses that ethylene can be successfully polymerized with at least one higher alpha-olefin by means of a titanium-based catalyst in a fluidized bed in the presence of high concentrations of hydrogen to produce ethylene copolymers having a melt index of from about 500 g/10 minutes to about 2500 g/10 minutes, while still maintaining satisfactory catalyst activity, provided that polymerization is first effected in the presence of a hydrogen concentration of less than 50 mol percent before the hydrogen concentration is increased to the level required to produce the desired products.

SUMMARY OF THE INVENTION

In accordance with the present invention it has now been discovered that ethylene can be continuously polymerized, either alone or together with at least one higher alpha-olefin, in a fluidized bed, to produce ethylene polymers having a melt index of from about 500 g/10 minutes to about 2500 g/10 minutes, while still maintaining satisfactory catalyst activity, without first effecting polymerization in the presence of a low concentration of hydrogen before increasing the hydrogen concentration to the level required to produce the desired products, provided that such polymerization is effected by means of a vanadium-based catalyst rather than the titanium-based catalyst of copending application Ser. No. 458,343.

Thus, the present invention provides a process for continuously producing ethylene polymers having a melt index of from about 500 g/10 minutes to about 2500 g/10 minutes which comprises polymerizing ethylene, or copolymerizing ethylene and at least one higher alpha-olefin, by continuously contacting, in a fluidized bed, at a temperature of from 10° C. up to 75° C. and a pressure no greater than 7,000 kPa, a gaseous mixture containing:

(i) ethylene, or ethylene and at least one higher alpha-olefin in a molar ratio of such higher alpha-olefin to ethylene of from 0.01:1 to 0.70:1, (ii) from 5 mol percent to 20 mol percent hydrogen, and (iii) from 15 mol percent to 40 mol percent of an inert gas, with a catalyst system comprising:
  (A) a solid catalyst component consisting essentially of
    (1) a solid, particulate, porous inorganic carrier, as support for
    (2) the reaction product of (a) a vanadium trihalide and (b) an electron donor, and
    (3) a boron halide or alkylaluminum modifier,
  (B) an alkylaluminum cocatalyst, and
  (C) a halohydrocarbon polymerization promoter.

DETAILED DESCRIPTION OF THE INVENTION

Fluidized bed reactors suitable for continuously preparing ethylene copolymers have been previously described and are well known in the art. Fluidized bed reactors useful for this purpose are described, e.g., in U.S. Pat. Nos. 4,302,565 and 4,302,566, the disclosures of which are incorporated herein by reference.

In order to produce ethylene homopolymers and copolymers having a melt index of from about 500 g/10 minutes to about 2500 g/10 minutes, it has been found necessary that the gaseous reaction mixture present in the polymerization reactor contain at least 5 mol percent hydrogen. Ordinarily, however, as the concentration of hydrogen in the reactor increases, the rate of polymerization declines. For this reason, the concentration of hydrogen in the reaction mixture should ordinarily not be permitted to exceed 20 mol percent. Usually the desired polymers are produced in the presence of a gaseous reaction mixture containing from 8 to 15 mol percent hydrogen. Generally the reaction mixture contains ethylene in an amount sufficient to produce a hydrogen to ethylene mol ratio of from 0.07:1 to 0.70:1, preferably from 0.10:1 to 0.50:1.

The higher alpha-olefin optionally employed to copolymerize with ethylene to produce the copolymers of the present invention plays an important role in determining the properties of such copolymers. Thus, for example, as the amount of higher alpha-olefin which copolymerizes with the ethylene increases, copolymers having progressively lower densities are obtained at any given melt index. The amount of higher olefin needed to produce copolymers of a given density will vary from olefin to olefin, under the same conditions, with larger amounts of olefin required as the number of carbon atoms in the olefin decreases.

The higher alpha-olefin optionally employed to copolymerize with ethylene also affects the molecular weight of the copolymers produced, with higher melt indices being obtained as the concentration of comonomer in the polymer increases. Polymer production also increases in the presence of comonomer.

The higher alpha-olefin which is optionally copolymerized with ethylene to produce the low molecular weight copolymers of the present invention may be present in the gaseous reaction mixture in an amount sufficient to provide a molar ratio of higher olefin to ethylene of from 0.01:1 to 0.70:1, preferably from 0.05:1 to 0.40:1. Such ratios will produce copolymers having a density of from 0.88 to g/cm$^3$ to 0.96 g/cm$^3$.

The higher alpha-olefins which can be polymerized with ethylene to produce the low molecular weight copolymers of the present invention can contain from 3 to 8 carbon atoms. These alpha-olefins should not contain any branching on any of their carbon atoms closer than two carbon atoms removed from the double bond. Suitable alpha-olefins include propylene, butene-1, pentene-1, hexene-1, 4-methylpentene-1, heptene-1 and octene-1. The preferred alpha-olefins are propylene, butene-1, hexene-1, 4-methylpentene-1 and octene-1.

In addition to hydrogen, ethylene, and at least one higher alpha-olefin, the reaction mixture also contains from 15 to 40 mol percent of an inert gas. By an "inert" gas is meant a gas which is nonreactive under the conditions employed during polymerization, i.e., does not decompose and/or react with the polymerizable monomers or other components of the reaction system under the polymerization conditions employed in the reactor. The inert gas serves as a diluent which helps reduce the tackiness of the polymer particles and their tendency to agglomerate, and thus helps prevent fouling of the reactor. Such gas should be insoluble in the polymer product so as not to contribute to polymer tackiness. Among such gases are nitrogen, argon, helium, methane, ethane, and the like.

The gaseous reaction mixture should, of course, be substantially free of catalyst poisons, such as moisture, oxygen, carbon monoxide, carbon dioxide, acetylene and the like.

In order to prevent polymer agglomeration, it is, of course, necessary to conduct polymerization at a temperature below the sintering temperature of the polymer product. Since the sintering temperature decreases along with the molecular weight of the product, the greater the concentration of hydrogen employed in the reactor, the lower the reaction temperature must be in order to prevent agglomeration. On the other hand, the temperature employed must be sufficiently elevated to prevent substantial condensation of the reaction mixture to the liquid state, as such condensation will cause the polymer particles being produced to cohere to each other and likewise aggravate the polymer agglomeration problem. This difficulty is normally associated with the use of alpha-olefins having 5 or more carbon atoms which have relatively high dew points. While some minor condensation is tolerable, anything beyond this will cause reactor fouling. Generally, in order to continuously produce the desired polymers while preventing polymer agglomeration, the temperature must not be permitted to rise above 75° C. Usually temperatures of from 10° C. to 75° C. are employed, depending upon the particular comonomer employed, the concentration of such comonomer in the reactor, and the molecular weight of the polymer product.

Pressures of up to about 7000 kPa can be employed in the process. Pressures of from about 70 kPa to 2500 kPa are preferred.

In order to maintain a viable fluidized bed, the superficial gas velocity of the gaseous reaction mixture through the bed must exceed the minimum flow required for fluidization, and preferably is at least 0.2 feet per second above the minimum flow. Ordinarily the superficial gas velocity does not exceed 5.0 feet per second, and most usually no more than 2.5 feet per second is sufficient.

The catalyst system employed in the process of the present invention comprises
  (A) a solid catalyst component consisting essentially of
    (1) a solid, particulate, porous inorganic carrier, as support for
    (2) the reaction product of (a) a vanadium trihalide and (b) an electron donor, and
    (3) a boron halide or alkylaluminum modifier,
  (B) an alkylaluminum cocatalyst, and (C) a halohydrocarbon polymerization promoter.

The vanadium trihalide which is reacted with the electron donor in the preparation of catalyst component (A) is preferably vanadium trichloride, although the halogen present in said vanadium trihalide may be chlorine, bromine or iodine, or any mixture thereof.

The electron donor employed is a liquid, organic Lewis base in which the vanadium trihalide is soluble.

Suitable electron donors include alkyl esters of aliphatic and aromatic carboxylic acids, aliphatic ketones, aliphatic amines, aliphatic alcohols, aliphatic ethers and cycloaliphatic ethers. Particularly useful are alkyl esters of saturated aliphatic carboxylic acids containing from 1 to 4 carbon atoms; alkyl esters of aromatic carboxylic acids containing from 7 to 8 carbon atoms; aliphatic ketones containing from 3 to 6 carbon atoms, preferably from 3 to 4 carbon atoms; aliphatic amines containing from 1 to 14 carbon atoms, preferably from 2 to 8 carbon atoms; aliphatic alcohols containing from 1 to 8 carbon atoms, preferably from 2 to 8 carbon atoms; aliphatic ethers containing from 2 to 8 carbon atoms, preferably from 4 to 5 carbon atoms; and cycloaliphatic ethers containing from 4 to 5 carbon atoms, preferably mono- or di- ethers containing 4 carbon atoms. The aliphatic and cycloaliphatic ethers are most preferred, particularly tetrahydrofuran. If desired, these electron donors may be substituted with one or more substituents which are inert under the reaction conditions employed during reaction with the vanadium trihalide, as well as during preparation of and polymerization with catalyst component (A).

The modifier employed in the preparation of catalyst component (A) is a boron halide or alkylaluminum compound having the formula:

$$MX_a$$

wherein:

M is boron or $AlR_{(3-a)}$ wherein each R is an alkyl radical containing from 1 to 14 carbon atoms, which radicals may be the same or different, X is selected from the group consisting of fluorine, chlorine, bromine and iodine, and mixtures thereof, and a is an integer having a value of 0, 1 or 2, provided that a is 3 when M is boron.

Preferably any halide present in the modifier is chlorine, and any alkyl radicals present contain from 1 to 6 carbon atoms. Such alkyl radicals may be cyclic, branched or straight chain, and may be substituted with one or more substituents which are inert under the reaction conditions employed during preparation of and polymerization with catalyst component (A). Diethylaluminum chloride is preferred.

A solid, particulate porous inorganic material is employed as carrier in the preparation of catalyst component (A). The carrier serves as support for the vanadium trihalide/electron donor reaction product and the boron halide or alkylaluminum modifier. Suitable carriers include such materials as oxides of silicon, aluminum and zirconium, as well as phosphates of aluminum. Usually these materials have an average particle size of from about 10 microns to about 250 microns, preferably from about 20 microns to about 150 microns, and a surface area of at least 3 square meters per gram, preferably at least 50 square meters per gram. Polymerization activity of the catalyst can be improved by employing a silica support having an average pore size of at least 80 Angstrom units, preferably at least 100 Angstrom units.

The carrier material should be dry, that is, free of absorbed water. Drying of the carrier material can be effected by heating, e.g., at a temperature of at least 600° C. when silica is employed as the support.

Catalyst component (A) is prepared by treating a solid, Particulate, porous inorganic carrier with:

(1) the reaction product of (a) a vanadium trihalide and (b) an electron donor, and (2) a boron halide or alkylaluminum modifier.

The vanadium trihalide/electron donor reaction product is prepared by dissolving at least one vanadium trihalide in at least one electron donor at a temperature of from about 20° C. up to the boiling point of the electron donor. Dissolution of the vanadium trihalide in the electron donor can be facilitated by stirring, and in some instances by refluxing, the vanadium trihalide in the electron donor. Up to several hours of heating may be required to complete dissolution.

After the vanadium trihalide has been dissolved in the electron donor, the reaction product is impregnated into the carrier. Impregnation may be effected by adding the carrier to the solution of the vanadium trihalide in the electron donor, and then drying the mixture to remove excess electron donor. The carrier may be added alone as a dry powder or, if desired, as a slurry in additional electron donor. Alternately, the solution of the vanadium trihalide in the election donor may be added to the carrier. Ordinarily the carrier and the solution of the vanadium trihalide in the electron donor are mixed together in such amounts that, after drying, the impregnated carrier contains from about 0.05 mmoles to about 0.6 mmoles of vanadium per gram, preferably from about 0.3 mmoles to about 0.6 mmoles of vanadium per gram, and most preferably from about 0.3 mmoles to about 0.5 mmoles of vanadium per gram. The impregnated vanadium trihalide/electron donor reaction product prepared in this manner contains from about 1 mole to about 5 moles, preferably from about 2 moles to about 4 moles, and most preferably about 3 moles of electron donor per mole of vanadium trihalide. Excess electron donor not actually complexed with the vanadium trihalide may remain adsorbed on the carrier without ill effects.

The boron halide or alkylaluminum modifier is usually added to the carrier after it has been impregnated with the vanadium trihalide/electron donor reaction product. However, if desired, the boron halide or alkylaluminum modifier may be added to the carrier before it is impregnated with the vanadium trihalide/electron donor reaction product. Addition of the modifier to the carrier may be effected by dissolving one or more modifiers in one or more inert liquid solvents capable of dissolving the modifier, immersing the carrier in the solution, and then drying the mixture to remove the solvent. If the modifier is applied subsequent to the vanadium trihalide/electron donor reaction product, the solvent must be one which does not dissolve the vanadium trihalide/electron donor reaction product. The carrier may be added to the solution of the modifier alone as a dry powder or, if desired, as a slurry in additional inert liquid solvent. Alternatively, the modifier may be added to a slurry of the carrier in the inert liquid solvent. Usually the modifier is added to the slurry dissolved in additional inert liquid solvent, although this is not necessary. Ordinarily the carrier and the solution of the modifier in the inert liquid solvent are mixed together in such amounts that, after drying, the carrier contains from about 0.1 mole to about 10 moles, preferably from about 1 mole to about 5 moles, of modifier per mole of vanadium trihalide/electron donor reaction product present in the carrier (or to be added to the carrier if it is applied subsequent to the modifier).

Among the solvents which can be employed to dissolve the boron halide or alkylaluminum modifier are hydrocarbon solvents such as isopentane, hexane, heptane, toluene, xylene and naphtha.

Component (B) of the catalyst system of the present invention is an alkylaluminum cocatalyst having the formula $$Al(R')_3$$

wherein each R' is a saturated hydrocarbon radical containing from 1 to 14 carbon atoms, which radicals may be the same or different. Such radicals may be substituted with one or more substituents which are inert under the reaction conditions employed during polymerization. Preferably R' is an alkyl radical containing from 1 to 8 carbon atoms.

Component (C) of the catalyst system of the present invention is a halohydrocarbon polymerization promoter having the formula $$R''_bCX'_{(4-b)}$$

wherein:
R" is hydrogen or an unsubstituted or halosubstituted alkyl radical containing from 1 to 6 carbon atoms, which radicals may be the same or different,
X' is halogen, and
b is 0, 1 or 2.

Preferred promoters include flouro-, chloro- or bromo- substituted ethane or methane, such as $CCl_4$, $CHCl_3$, $CH_2Cl_2$, $CBr_4$, $CFCl_3$, $CH_3CCl_3$, and $CF_2ClCCl_3$. Particularly preferred promoters are $CH_3CCL_3$, $CFCl_3$, and $CHCl_3$.

The solid catalyst component, cocatalyst and polymerization promoter can be introduced into the polymerization reactor through separate feed lines or, if desired, two or all of the components may be partially or completely mixed with each other before they are introduced into the reactor. In any event, the cocatalyst and polymerization promoter are employed in such amounts as to provide a molar ratio of the promoter to the alkylaluminum cocatalyst of from about 0.1:1 to about 10:1, preferably from about 0.2:1 to about 2:1, and the cocatalyst and the solid catalyst component are employed in such amounts as to provide an atomic ratio of aluminum in the cocatalyst to vanadium in the solid catalyst component of from about 10:1 to about 400:1, preferably from about 15:1 to about 60:1.

Both the cocatalyst and the polymerization promoter may be introduced into the reactor dissolved in an inert liquid solvent, i.e., a solvent which is nonreactive with all the components of the catalyst system as well as all the components of the reaction system. Hydrocarbons such as isopentane, hexane, heptane, toluene, xylene, naphtha and mineral oil are preferred for this purpose. Generally, such solutions contain from 1 weight percent to 75 weight percent of the cocatalyst and/or the polymerization promoter. If desired, less concentrated or more concentrated solutions can be employed, or, alternatively, the cocatalyst and polymerization promoter can be added in the absence of solvent, or, if desired, suspended in a stream of liquified monomer. When a solvent is employed, the amount of solvent introduced into the reactor should be carefully controlled so as to avoid the use of excessive quantities of liquid which would interfere with the operation of the fluidized bed.

The solvents employed to dissolve the cocatalyst and the polymerization promoter may also be employed to introduce the solid catalyst component into the reactor. Higher boiling solvents, such as mineral oil, are preferred for this purpose. While the solid catalyst component may also be introduced into the reactor in the absence of solvent or suspended in liquified monomer, such solvents may be employed to disperse the solid catalyst component and facilitate its flow into the reactor. Such dispersions generally contain from 1 weight percent to 75 weight Percent of the solid precursor.

By operating under the polymerization conditions described herein it is possible to continuously polymerize ethylene in a fluidized bed, either alone or together with one or more higher alpha olefins containing from 3 to 8 carbon atoms, to produce low molecular weight polymers having a melt index of from about 500 g/10 minutes to about 2500 g/10 minutes. By "continuously polymerize" as used herein is meant the capability of uninterrupted polymerization for weeks at a time, i.e., at least in excess of 168 hours, and usually in excess of 1000 hours without reactor fouling due to the production of large agglomerations of polymer.

The low molecular weight ethylene homopolymers and copolymers produced in accordance with the process of the present invention usually have a density of from 0.88 $g/cm^3$ to 0.96 $g/cm^3$. The copolymers may contain from 54 mol percent to 94 mol percent of polymerized ethylene and from 6 mol percent to 46 mol percent of polymerized alpha-olefin containing from 3 to 8 carbon atoms.

The low molecular weight homopolymers and copolymers produced in accordance with the present invention have a number average molecular weight ($M_n$) of from about 1,000 to about 7,000.

The low molecular weight ethylene homopolymers and copolymers produced in accordance with the process of the present invention have a melt index of from about 500 g/10 minutes to about 2500 g/10 minutes, preferably from about 500 g/10 minutes to about 2000 g/10 minutes. The melt index of a polymer varies inversely with its molecular weight and is a function of the hydrogen/monomer ratio employed in the reaction system, the polymerization temperature, and the density of the polymer. Thus, the melt index is raised by increasing the hydrogen/monomer ratio, the polymerization temperature, and/or the ratio of higher alpha olefin to ethylene employed in the reaction system.

The low molecular weight homopolymers and copolymers produced in accordance with the present invention have a melting point of from about 110° C. to about 145° C., and contain from 1 to 40 chain branches per 1,000 carbon atoms.

The low molecular weight homopolymers and copolymers produced in accordance with the present invention have a residual catalyst content of less than 0.20 weight percent. The residual vanadium content of such polymers is less than 15 parts per million (ppm), usually from 5 to 8 parts per million (ppm).

The low molecular weight ethylene homopolymers and copolymers produced in accordance with the present invention are granular materials having an average particle size of from about 0.01 to about 0.07 inches, usually of from about 0.02 to about 0.05 inches, in diameter. Particle size is important for the purpose of readily fluidizing the polymer particles in the fluid bed reactor.

The ethylene polymers produced in accordance with the process of the present invention have a bulk density of from about 16 pounds per cubic foot to about 25 pounds per cubic foot.

The following Examples are designed to illustrate the present invention and are not intended as a limitation upon the scope thereof.

The properties of the polymers described Density herein were determined by the following test methods:

A plaque is made at 175° C.±5° C. and uniformly cooled at a rate of 15° C.±2° C. per minute in accordance with ASTM D-1248 and D-1928, Procedure C. Density measurement is then made in a density gradient column in accordance with ASTM D-1505.

Melt Index (MI)

Determined at 190° C. for polymers having a melt index of less than 1000 grams per 10 minutes by applying a weight load of 2050 grams to the sample and counting the number of seconds required for the molten polymer to flow one inch through a die having a diameter of 0.041±0.002 inch and a height of 0.157±0.002 inch. Melt index was then calculated according to the equation:

$$MI = \frac{K}{T}$$

when T is the time in seconds and K is a constant determined from a polymer of known melt index.

The melt index of polymers having a melt index of greater than 1,000 grams per 10 minutes is determined in a similar manner at 125° C. using a weight load of 225 grams.

Fines

Weight percent of polymer particles which pass through a 120 mesh screen.

Rubble

Weight percent of polymer particles which are collected on a 10 mesh screen.

Productivity

A sample of the resin product is ashed, and the weight percent of ash is determined. The amount of V and halide in the ash is determined by elemental analysis. Productivity is expressed in terms of parts per million of V in the polymer.

Average Particle Size

Calculated from sieve analysis data according to ASTM D-1921, Method A, using a 500 g sample. Calculations are based on weight fractions retained on the screens.

Bulk Density

ASTM D-1895, Method B. The resin is poured via ⅜" diameter funnel into a 400 ml graduated cylinder to the 400 ml line without shaking the cylinder, and weighed by difference.

EXAMPLE 1

Impregnation of Carrier with VCl₃/THF Reaction Product

To a reactor vessel equipped with a mechanical stirrer were added 2.74 cubic meters (2.74 m³) of anhydrous tetrahydrofuran (THF), followed by 15.88 kilograms (1000 moles) of solid VCl₃. The mixture was heated under nitrogen at a temperature of 70° C. for 6 hours with continuous stirring in order to completely dissolve the VCl₃.

The solution prepared in this manner was added to 317.52 kilograms of silica gel which had been dehydrated by heating under nitrogen at a temperature of 600° C. for 4 hours. The resulting mixture was stirred for 30 minutes under nitrogen, and then heated under reduced pressure at a temperature of 60° C. for about 10 hours to produce a dry, free-flowing powder containing about 8 weight percent THF.

EXAMPLE 2

Treatment of Carrier with Diethylaluminum Chloride

Three hundred eighty-five and one half kilograms (385.5 kg) of the silica carrier impregnated with VCl₃/THF reaction product in accordance with Example 1 were slurried in 2.57 cubic meters (2.57 m³) of anhydrous isopentane. The slurry was stirred while a 20 weight percent solution of diethylaluminum chloride in anhydrous hexane was added. The impregnated carrier and the diethylaluminum chloride solution were employed in amounts that provided an atomic ratio of aluminum to vanadium of 4.25:1. After addition of the diethylaluminum chloride solution was complete, the mixture was heated at a temperature of 45° C. for about 9 hours under reduced pressure to produce a dry, free-flowing powder.

Comparative EXAMPLE A

The silica-impregnated catalyst component prepared in accordance with Example 2 was employed together with triethylaluminum, as cocatalyst, and fluorotrichloromethane (CFCl₃), as polymerization promoter, to copolymerize ethylene with butene-1 in the presence of 0.9 mol percent hydrogen in a fluidized bed reactor system similar to the one described and illustrated in U.S. Pat. Nos. 4,302,565 and 4,302,566. The polymerization reactor had a lower section 10 feet high and 18 inches in diameter, and an upper section 12.5 feet high and 30 inches in diameter.

The silica-impregnated catalyst component was continually fed to the polymerization reactor along with a 5 percent solution of triethylaluminum in isopentane and a 5 percent solution of fluorotrichloromethane (CFCl₃) in isopentene.

Polymerization was effected at a pressure of 2068 kPa and a temperature of 88° C. using a gaseous reaction mixture containing 45.1 mol percent ethylene, 5.9 mol percent butene-1, 0.9 mol percent hydrogen, and 47.4 mol percent nitrogen. The gaseous mixture was passed through the bed at a superficial gas velocity of about 1.8 ft/sec.

Table 1 below summarizes the reaction conditions employed in this polymerization, the properties of the copolymer produced by such polymerization under steady state conditions, and the productivity of the catalyst system employed in terms of residual ash in the copolymer.

EXAMPLE 3

Ethylene was copolymerized with butene-1 using the same fluidized bed reactor system and catalyst system employed in Comparative Example A.

Polymerization was effected at a pressure of 2068 kPa and a temperature of 75° C. using a gaseous reaction mixture containing 43.5 mol percent ethylene, 5.6 mol percent butene-1, 8.7 mol percent hydrogen, and 41.2 mol percent nitrogen. The gaseous mixture was passed through the bed at a superficial gas velocity of about 1.8 ft/sec.

The details of this polymerization are set forth in Table 1 below along with the details of Comparative Example A.

TABLE 1

| Example | Comp. Exp. A | 3 |
|---|---|---|
| Polymerization Conditions | | |
| Temperature, °C. | 88 | 75 |
| Pressure, kPa | 2068 | 2068 |
| Al/V Ratio | 50 | 111 |
| CFCl$_3$/V Ratio | 27 | 58 |
| Space-Time Yield (lb/hr/ft$^3$) | 2.7 | 1.6 |
| Mol % Hydrogen | 0.9 | 8.7 |
| Mol % Nitrogen | 47.4 | 41.2 |
| Mol % Ethylene | 45.1 | 43.5 |
| Mol % Butene | 5.9 | 5.6 |
| Hydrogen/Ethylene Mol Ratio | 0.02 | 0.20 |
| Butene/Ethylene Mol Ratio | 0.13 | 0.13 |
| Polymer Properties | | |
| Melt Index, g/10 min | 0.78 | 800 |
| Density, gm/cc | 0.918 | 0.925 |
| Bulk Density, lbs/ft$^3$ | 26.8 | 21.7 |
| Avg. Particle Size, in | 0.023 | 0.039 |
| Fines, % | 0.8 | 0.6 |
| Rubble, % | 0 | 0 |
| Productivity | | |
| Ash, % | 0.04 | — |
| V, ppm | 7.9 | 5.1 |

I claim:

1. A continuous process for producing ethylene polymers having a melt index of from 500 g/10 minutes to 2500 g/10 minutes which comprises polymerizing ethylene, or copolymerizing ethylene and at least one higher alpha-olefin, by continuously contacting, in a fluidized bed, at a temperature of from 10° C. up to 75° C. and a pressure no greater than 7,000 kPa, a gaseous mixture containing:

(i) ethylene, or ethylene and at least one higher alpha-olefin containing from 3 to 8 carbon atoms in a molar ratio of such higher alpha-olefin to ethylene of from 0.1:1 to 0.70:1

(ii) from 5 mol percent to 20 mol percent hydrogen, and (iii) from 15 mol percent to 40 mol percent of an inert gas selected from the group consisting of nitrogen, argon, helium, methane and ethane, with a catalyst system comprising:

(A) a solid catalyst component consisting essentially of (1) a solid, particulate, porous inorganic carrier, as support for (2) the reaction product of (a) a vanadium trihalide and (b) an electron donor, and (3) a modifier having the formula:

$MX_a$ wherein:

M is boron or $AlR_{(3-a)}$ wherein each R is an alkyl radical containing from 1 to 14 carbon atoms, X is selected from the group consisting of fluorine, chlorine, bromine and iodine, and mixtures thereof, and a is an integer having a value of 0, 1 or 2, provided that a is 3 when M is boron, (B) an alkylaluminum cocatalyst having the formula $Al(R')_3$ wherein: R' is a saturated hydrocarbon radical containing from 1 to 14 carbon atoms, and (C) a halohydrocarbon polymerization promoter having the formula $(R'')_b CX'_{(4-b)}$ wherein:

R'' is hydrogen or an unsubstituted or halosubstituted alkyl radical containing from 1 to 6 carbon atoms, X' is halogen, and b is 0, 1 or 2.

2. A process as in claim 1 wherein the electron donor is selected from the group consisting of alkyl esters of aliphatic and aromatic carboxylic acids, aliphatic ketones, aliphatic amines, aliphatic alcohols, aliphatic ethers and cycloaliphatic ethers.

3. A process as in claim 1 wherein said inorganic carrier is silica; said vanadium trihalide contains chlorine; said electron donor is an aliphatic or cycloaliphatic ether; said modifier is an alkylaluminum compound wherein each alkyl radical contains from 1 to 6 carbon atoms and any halide present is chlorine; said cocatalyst is a trialkylaluminum wherein each alkyl radical contains from 1 to 8 carbon atoms; and said polymerization promoter is a fluoro-, chloro- or bromo- substituted ethane or methane.

4. A process as in claim 1 wherein said inorganic carrier is silica; said vanadium trihalide is vanadium trichloride; said electron donor is tetrahydrofuran; said modifier is diethylaluminum chloride; said cocatalyst is triethylaluminum; and said polymerization promoter is fluorotrichloromethane.

5. A process as in claim 1 wherein the molar ratio of hydrogen to ethylene in the gaseous mixture is from 0.07:1 to 0.70:1.

6. A process as in claim 5 wherein the electron donor is selected from the group consisting of alkyl esters of aliphatic and aromatic carboxylic acids, aliphatic ketones, aliphatic amines, aliphatic alcohols, aliphatic ethers and cycloaliphatic ethers.

7. A process as in claim 5 wherein said inorganic carrier is silica; said vanadium trihalide contains chlorine; said electron donor is an aliphatic or cycloaliphatic ether; said modifier is an alkylaluminum compound wherein each alkyl radical contains from 1 to 6 carbon atoms and any halide present is chlorine; said cocatalyst is a trialkylaluminum wherein each alkyl radical contains from 1 to 8 carbon atoms; and said polymerization promoter is a fluoro-, chloro- or bromo- substituted ethane or methane.

8. A process as in claim 5 wherein said inorganic carrier is silica; said vanadium trihalide is vanadium trichloride; said electron donor is tetrahydrofuran; said modifier is diethylaluminum chloride; said cocatalyst is triethylaluminum; and said polymerization promoter is fluorotrichloromethane.

9. A process as in claim 1 wherein the molar ratio of higher alpha olefin to ethylene in the gaseous mixture is from 0.05:1 to 0.40:1.

10. A process as in claim 9 wherein the electron donor is selected from the group consisting of alkyl esters of aliphatic and aromatic carboxylic acids, aliphatic ketones, aliphatic amines, aliphatic alcohols, aliphatic ethers and cycloaliphatic ethers.

11. A process as in claim 9 wherein said inorganic carrier is silica; said vanadium trihalide contains chlorine; said electron donor is an aliphatic or cycloaliphatic ether; said modifier is an alkylaluminum compound wherein each alkyl radical contains from 1 to 6 carbon atoms and any halide present is chlorine; said cocatalyst is a trialkylaluminum wherein each alkyl radical contains from 1 to 8 carbon atoms; and said polymerization promoter is a fluoro-, chloro- or bromo- substituted ethane or methane.

12. A process as in claim 9 wherein said inorganic carrier is silica; said vanadium trihalide is vanadium trichloride; said electron donor is tetrahydrofuran; said modifier is diethylaluminum chloride; said cocatalyst is triethylaluminum; and said polymerization promoter is fluorotrichloromethane.

13. A process as in claim 9 wherein the gaseous mixture contains from 8 mol percent to 15 mol percent hydrogen.

14. A process as in claim 13 wherein the electron donor is selected from the group consisting of alkyl esters of aliphatic and aromatic carboxylic acids, aliphatic ketones, aliphatic amines, aliphatic alcohols, aliphatic ethers and cycloaliphatic ethers.

15. A process as in claim 13 wherein said inorganic carrier is silica; said vanadium trihalide contains chlorine; said electron donor is an aliphatic or cycloaliphatic ether; said modifier is an alkylaluminum compound wherein each alkyl radical contains from 1 to 6 carbon atoms and any halide present is chlorine; said cocatalyst is a trialkylaluminum wherein each alkyl radical contains from 1 to 8 carbon atoms; and said polymerization promoter is a fluoro-, chloro- or bromo- substituted ethane or methane.

16. A process as in claim 13 wherein said inorganic carrier is silica; said vanadium trihalide is vanadium trichloride; said electron donor is tetrahydrofuran; said modifier is diethylaluminum chloride; said cocatalyst is triethylaluminum; and said polymerization promoter is fluorotrichloromethane.

17. A process as in claim 13 wherein the molar ratio of hydrogen to ethylene in the gaseous mixture is from 0.10:1 to 0.50:1.

18. A process as in claim 17 wherein the electron donor is selected from the group consisting of alkyl esters of aliphatic and aromatic carboxylic acids, aliphatic ketones, aliphatic amines, aliphatic alcohols, aliphatic ethers and cycloaliphatic ethers.

19. A process as in claim 17 wherein said inorganic carrier is silica; said vanadium trihalide contains chlorine; said electron donor is an aliphatic or cycloaliphatic ether; said modifier is an alkylaluminum compound wherein each alkyl radical contains from 1 to 6 carbon atoms and any halide present is chlorine; said cocatalyst is a trialkylaluminum wherein each alkyl radical contains from 1 to 8 carbon atoms; and said polymerization promoter is a fluoro-, chloro- or bromo- substituted ethane or methane.

20. A process as in claim 17 wherein said inorganic carrier is silica; said vanadium trihalide is vanadium trichloride; said electron donor is tetrahydrofuran; said modifier is diethylaluminum chloride; said cocatalyst is triethylaluminum; and said polymerization promoter is fluorotrichloromethane.

* * * * *